(12) United States Patent
Sawyer et al.

(10) Patent No.: US 7,910,527 B2
(45) Date of Patent: Mar. 22, 2011

(54) WEAR RESISTANT LUBRICIOUS COMPOSITE

(75) Inventors: Wallace Gregory Sawyer, Gainesville, FL (US); Ben Peter Boesl, Gainesville, FL (US); Nicole Lee McCook, Gainesville, FL (US); David L. Burris, Gainesville, FL (US)

(73) Assignee: University of Florida Research Foundation, Gainesville, FL (US)

( * ) Notice: Subject to any disclaimer, the term of this patent is extended or adjusted under 35 U.S.C. 154(b) by 1039 days.

(21) Appl. No.: 11/385,062

(22) Filed: Mar. 21, 2006

(65) Prior Publication Data
US 2007/0225178 A1 Sep. 27, 2007

(51) Int. Cl.
*C10M 177/00* (2006.01)
*C10M 125/10* (2006.01)
*F16C 33/20* (2006.01)

(52) U.S. Cl. ......... 508/181; 508/103; 508/104; 508/106

(58) Field of Classification Search ............. 508/106, 508/181–183, 103, 104
See application file for complete search history.

(56) References Cited

U.S. PATENT DOCUMENTS

| | | | | |
|---|---|---|---|---|
| RE29,092 E | * | 12/1976 | Schiefer et al. | 508/106 |
| 4,252,658 A | | 2/1981 | Tasaka et al. | |
| 4,822,646 A | | 4/1989 | Clark et al. | |
| 4,915,856 A | | 4/1990 | Jamison | |
| 5,171,622 A | | 12/1992 | Wegner | |
| 5,268,216 A | | 12/1993 | Keem et al. | |
| 5,354,487 A | | 10/1994 | Aoki et al. | |
| 5,427,698 A | * | 6/1995 | Hirokawa et al. | 508/106 |
| 5,445,748 A | | 8/1995 | Holinski | |
| 5,470,494 A | | 11/1995 | Umeda | |
| 5,866,518 A | | 2/1999 | Dellacorte et al. | |
| 5,962,376 A | * | 10/1999 | Yamazaki et al. | 508/106 |
| 6,071,609 A | | 6/2000 | Furutani et al. | |
| 6,649,573 B2 | | 11/2003 | Mitrovich | |
| 6,815,400 B2 | | 11/2004 | Jee et al. | |
| 7,081,234 B1 | * | 7/2006 | Qi et al. | 423/592.1 |
| 2002/0151440 A1 | | 10/2002 | Mitrovich | |
| 2003/0229176 A1 | * | 12/2003 | Trombetta et al. | 524/589 |
| 2004/0014610 A1 | | 1/2004 | Lockett | |
| 2004/0043908 A1 | | 3/2004 | Mitrovich | |
| 2005/0096234 A1 | | 5/2005 | Mack et al. | |
| 2005/0124505 A1 | | 6/2005 | Hajmrle et al. | |

(Continued)

OTHER PUBLICATIONS

N.L. McCook et al. "Effects of the Fraction of PTFE and Film Thickness on Wear and Friction in an ePTFE and Epoxy Composite Solid Lubricant Coating", Proceedings of the World Tribology Congress III, Washington Hilton, Washington, DC, (2005), Paper # WTC2005-63555, 2 pages.

(Continued)

*Primary Examiner* — Glenn A Caldarola
*Assistant Examiner* — Vishal Vasisth
(74) *Attorney, Agent, or Firm* — Thomas, Kayden, Horstemeyer & Risley, LLP (57) ABSTRACT

A wear resistant lubricious composite includes a synthetic resin binder, a plurality of transfer film forming particles, and a plurality of hard nanoparticles. The hard nanoparticles are selected from the group consisting of metal oxides, metal carbides and metal nitride nanoparticles. A method of forming wear resistant lubricious composite articles includes the steps of providing a liquid phase synthetic resin precursor, adding a plurality of transfer film forming particles and a plurality of hard nanoparticles selected from the group consisting of metal oxide, metal carbide and metal nitride nanoparticles to the resin precursor to form a mixture, adding a hardener to the mixture, and curing the mixture.

16 Claims, 6 Drawing Sheets

U.S. PATENT DOCUMENTS

| | | | |
|---|---|---|---|
| 2005/0152806 A1 | 7/2005 | Dunmead et al. | |
| 2006/0019085 A1* | 1/2006 | Lam et al. | 428/304.4 |
| 2007/0116976 A1* | 5/2007 | Tan et al. | 428/546 |

OTHER PUBLICATIONS

Burris et al. "Development and Tribological Investigation of an Ultra-Low Wear Solid Lubricating Composite", Society of Tribologists and Lubrication Engineers, May 2005, Las Vegas, Nevada, 25 pages.

Hamilton et al. "Vacuum Tribology of an Ultra Low Wear Rate PEEK/PTFE Composite", Society of Tribologists and Lubrication Engineers Annual Meeting, Las Vegas, Nevada, 2005, 21 pages.

Burris et al. "PTFE Nanocomposites", STLE—Solid Lubricants, May 2004, 25 pages.

Avella et al. "PVA/PTFE Nanocomposites: Thermal, Mechanical, and Barrier Properties", Journal of Materials Science, (2004), vol. 39, pp. 6133-6136.

Lince et al. "Tribology of Co-Sputtered Nanocomposite Au/MoS2 Solid Lubricant Films Over a Wide Contact Stress Range", Submitted for Publication in the Journal Wear, Abstract.

SIBR Report "Low Friction Coefficient Electroplated Solid-Lubricant/Nickel/Hard-Particle Nanocomposite Coatings for Transmission Gear Surfaces", Inframate Corporation, 7 pages.

Teer "New Wear Resistant Solid Lubricant Coatings", Abstract, Oct. 28, 2000, 2 pages.

Erdemir "Review of Engineered Tribological Interfaces for Improved Boundary Lubrication", Tribology International, (2005), vol. 38, pp. 249-256.

Voevodin et al. "Nanocomposite and Nanostructured Tribological Materials for Space Applications", Composites Science and Technology, (2005), vol. 65, pp. 741-748.

Schmitz, T., et al., The difficulty of measuring low friction: Uncertainty analysis for friction coefficient measurements. Journal of Tribology-Transactions of the ASME, 2005. 127(3): p. 673-678.

Schmitz, T., et al., Wear-rate uncertainty analysis. Journal of Tribology-Transactions of the ASME, 2004. 126(4): p. 802-808.

Burris, D. and W. Sawyer, Tribological sensitivity of PTFE-alumina nanocomposites to a range of traditional surface finishes; Tribology Transactions, 2005. 48(2): p. 147-153.

N. L. McCook, D. L. Burns, G. R. Bourne, J. Steffens, J. R. Hanrahan & W. G. Sawyer "Wear Resistant Solid Lubricant Coating Made from PTFE and Epoxy" Tribology Letters, vol. 18, No. 1, Jan. 2005.

"Cryogenic Friction Behavior of PTFE Based Solid Lubricant Composites" N.L. McCook, D.L. Burris, P.L. Dickrell and W. G. Sawyer, Submitted for Publication in the Journal Tribology Letters.

"Improved Wear Resistance in Alumina-PTFE Nanocomposites with Irregular Shaped Nanoparticles" D. L. Burris* and W. G. Sawyer, Submitted for Publication in the Journal Wear.

Burris, D. et al. "A low friction and ultra low wear rate PEEK/PTFE composite", Wear, 2006, 9 pages.

N.L. McCook et al. "Cumulative Damage Modeling of Solid Lubricant Coatings that Experience Wear and Interfacial Fatigue", inventor paper, 13 pages.

* cited by examiner

WEAR RESISTANT LUBRICIOUS COMPOSITE

STATEMENT REGARDING FEDERALLY SPONSORED RESEARCH OR DEVELOPMENT

The United States Government has certain rights pursuant to NSF Grant No. CMS-0099649.

CROSS-REFERENCE TO RELATED APPLICATIONS

Not applicable.

FIELD OF THE INVENTION

The invention relates to polymer comprising composites, more specifically to lubricious low wear polymer comprising composites.

BACKGROUND OF THE INVENTION

Solid lubrication offers many benefits over conventional oil-based hydrodynamic and boundary lubrication. Solid lubrication systems are generally more compact and less costly than oil lubricated systems since pumps, lines, filters and reservoirs are usually required in oil lubricated systems. Greases can contaminate the product of the system being lubricated, making it undesirable for food processing and both grease and oil outgas in vacuum precluding their use in space applications. One of the primary goals of a solid lubricant is obtaining low friction.

Polytetrafluoroethylene (PTFE) is known by the trade name TEFLON®. PTFE is well known as a low friction material and has thus received much attention for use as a solid lubricant. It also has other desirable properties including high melting temperature, chemical inertness, biocompatibility, low outgassing and low water absorption. However, PTFE wears much more rapidly than most other polymers preventing its use as a bearing material in most cases.

A variety of solid lubricant applications require low cost solid lubricants. Epoxies are generally producible at low cost, and are easily formable into a variety of shapes. Although generally not lubricious in neat form and having a poor friction coefficient and wear resistance, epoxy-based composites can provide reasonable tribological properties by adding certain fillers, such as $TiO_2$, $SiO_2$, $Al_2O_3$, and $Si_3N_4$.

Some of the present inventors have disclosed low cost composite coatings consisting of PTFE and Epoxy which provide a 100× improvement in wear resistance as compared to either of its constituents alone and reduced friction coefficient. (See N. L. McCook, D. L. Burris, G. R. Bourne, J. Steffens, J. R. Hanrahan & W. G. Sawyer "Wear Resistant Solid Lubricant Coating Made from PTFE and Epoxy" Tribology Letters, Vol. 18, No. 1, Jan. 2005). The discussed coating is made by impregnating an expanded PTFE film with epoxy. Although the disclosed Epoxy/PTFE composite provides a good combination of wear resistance and friction coefficient, low cost wear resistant lubricious composites having higher wear resistance and friction coefficient are desired for many applications.

SUMMARY

A wear resistant lubricious composite includes a synthetic resin binder, a plurality of transfer film forming particles, and a plurality of hard nanoparticles. The hard nanoparticles are selected from the group consisting of metal oxides, metal carbides and metal nitride nanoparticles. In a preferred embodiment, the transfer film forming particles comprise PTFE nanoparticles, and are preferably all nanoparticles. In one embodiment, the synthetic resin is an epoxy resin, and the hard nanoparticles comprise zinc oxide nanoparticles. For example, the composite can comprise between 60 and 85 volume % epoxy resin, 12 to 17 vol. % PTFE, and 0.8 to 5 volume % zinc oxide. The wear rate of the composite can be $<1 \times 10^{-6}$ mm$^3$/Nm and a friction coefficient of the composite can be <0.2. The composite can further comprise a base metal article, wherein the composition is disposed on the base metal article.

A method of forming wear resistant lubricious composite articles includes the steps of providing a liquid phase synthetic resin precursor, adding a plurality of transfer film forming particles and a plurality of hard nanoparticles selected from the group consisting of metal oxide, metal carbide and metal nitride nanoparticles to the resin precursor to form a mixture, adding a hardener to the mixture, and curing the mixture. The method can further comprise the step of dispersing the transfer film forming particles and the plurality of hard nanoparticles after the adding step. The method can also further comprise the step of applying the mixture to a surface to be coated before adding the hardener. The surface to be coated can comprise a metal or a metal alloy.

The transfer film forming particles can comprise PTFE, and are preferably PTFE nanoparticles. In one embodiment, the synthetic resin is an epoxy resin, and the hard nanoparticles comprise zinc oxide nanoparticles.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

A wear resistant lubricious composite comprises a synthetic resin binder, a plurality of transfer film forming particles, and a plurality of hard nanoparticles selected from the group consisting of metal oxide, metal carbide and metal nitride nanoparticles. The plurality of transfer film forming particles and plurality of hard nanoparticles fillers are generally randomly distributed in the continuous phase resin binder matrix.

The synthetic resin can be selected from polyamide resins (PA), polyamide-imide resins (PAI), polybenzimidazole resin (PBI), epoxy resins (EP), and phenolic resins. The synthetic resin is generally from 80 to 99 volume % of the composite. In a preferred embodiment, the synthetic resin binder is an epoxy resin. The epoxy matrix allows for easy manufacture of large complex parts at low cost. Epoxy is also easily colored. The resulting composite material is also easily bonded to a wide variety of surfaces.

The size of the transfer film forming particles generally governs the size of the wear debris, uniformity and thickness of the transfer film. The role of the transfer film forming particles is to be expressed as fine debris and form a thin, uniform transfer film protecting the resin binder from damage. The transfer film forming lubricious particles are preferably PTFE particles, but can generally be selected from a variety lubricious nanoparticles, such as $WS_2$, $MoS_2$, boron nitride (BN) and fluorinated ethylene propylene (FEP). The transfer film forming particles are preferably microsize or nanosize. The transfer film forming particles are generally from 1 to 18 volume % of the composite.

The plurality of hard nanoparticles can be selected from metal oxides, metal carbides and metal nitrides. As defined herein, hard particles refer to particles having a Mohs hardness of at least 5, and preferably at least 7. For example, the metal oxide can include $TiO_2$, $Al_2O_3$, carbides can include WC, $Mo_2C$, SiC, and nitrides can include $Si_3N_4$. The hard particles are generally from 0.5 to 10 volume % of the composite.

In one embodiment of the invention, the composite comprises an epoxy matrix having metal oxide particles and PTFE. The composite in this embodiment preferably comprises epoxy between 60 and 85 vol. %, with 0.8 to 5 vol. % ZnO, and 12 to 17 vol. % PTFE. A wear rate of the composite is preferably $<1\times10^{-6}$ mm$^3$/Nm and a friction coefficient of the composite is preferably <0.2.

Solid lubricants according to the invention are generally inexpensive based on low cost resins and a low vol % of the respective fillers. The invention can be used in a variety of products, including products that were prior to the invention not economically feasible, such as machined complex shaped parts and large parts. Exemplary products generally have a need for low friction and wear resistance in rubbing contact. Such products include fittings, bushings, bearings and valves. Compositions according to the invention can be easily bonded to a variety of substrates, can be molded into large irregular shapes, and provide high wear resistance and low friction with low levels of filler loading. The mixing techniques described herein that can be used to form inventive composites include well known techniques, which can be readily industrialized. One method uses an apparatus analogous to a paint mixer.

As noted above, composites according to the invention are generally also easily colored. Moreover, composites according to the invention can be stored as a liquid resin precursor already containing the fillers. Upon addition of a suitable hardener, composites according to the invention can then be formed.

Figure 1:
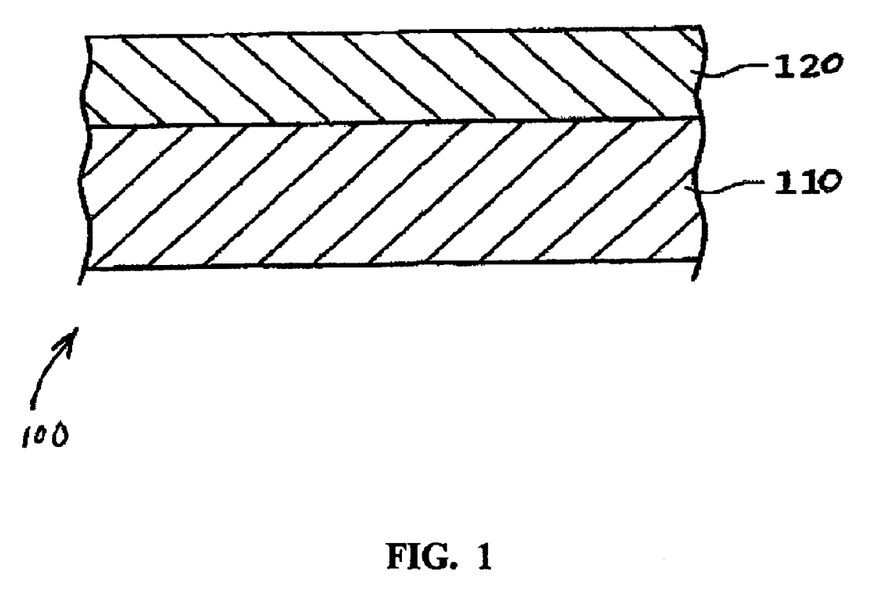
FIG. 1 shows a partial cross sectional view of a bearing having a surface coating comprising a composite coating layer according to the invention disposed on a base metal layer.

For example, FIG. 1 shows a partial cross sectional view of a bearing 100 having a surface coating comprising a composite coating layer 120 according to the invention disposed on a base metal layer 110 As noted above, composite coating layer 120 can be applied in liquid precursor form, such as by spray coating, having a suitable hardener as noted above added proximate to the time of application. Other methods of application include molding and painting. Although not show, an intermediate layer (e.g. alloy layer) can be disposed between base metal layer 110 and composite coating layer 120.

EXAMPLES

The present invention is further illustrated by the following specific Examples, which should not be construed as limiting the scope or content of the invention in any way.

Nanocomposites formed for comprised an epoxy matrix having both zinc oxide and PTFE filler particles. Epoxy was used as a matrix for the composites tested because of it ability to adhere to a variety of other surfaces and because it is easily molded into large irregular parts. For this study, the epoxy matrix was originally filled with small volume percents of zinc oxide to increase the wear resistance. As described below, the wear resistance of the epoxy/PTFE/ZnO (14.5 vol. % PTFE and 1 vol. % ZnO) composite surprisingly increased by more than 1000× compared to an epoxy/PTFE composite (14.5 vol. % PTFE).

According to manufacturer data, the average size of the zinc oxide and PTFE particles used was 53 nm and 200 nm, respectively. Both the zinc oxide particles and the PTFE particles were agglomerated prior to sonicating and dispersing them in the epoxy resin precursor. The PTFE particles were in agglomerations of around 500 nm and the zinc oxide particles had some smaller agglomerations and some larger agglomerations up to 500-750 nm in size.

Using acetone as a solvent, the epoxy resin precursor was mixed at room temperature with a 10:2 (resin:acetone) weight percent ratio and manually stirred for 5 minutes. Next, the zinc oxide and PTFE nanoparticles were mixed in slowly while stirring continuously. The mixture was then placed in a bath sonicator for 6 hours to disperse the particles and reduce the amount and size of agglomerations of the PTFE and zinc oxide nanoparticles. The mixture was then placed in a vacuum oven at 75° C. for 2 hours to vaporize off the acetone. Air was pumped out slowly so that the mixture would refrain from volatilizing. The epoxy hardener was then added with a 10:2.5 (resin:hardener) weight percent ratio and the mixture was poured into a mold. The mixture was then cured at 60° C. for 2 hours.

Once cured the specimen was removed from the mold, the specimen was post-cured at 170° C. for 50 minutes, and then milled to the desired shape. Several different epoxy/ZnO/PTFE compositions were fabricated for testing to identify the lowest wear rate and friction coefficient. To do this, three initial samples were created at points on a ternary diagram. The initial three points were chosen at random with small volume percents of PTFE and zinc oxide nanoparticles.

Figure 2:
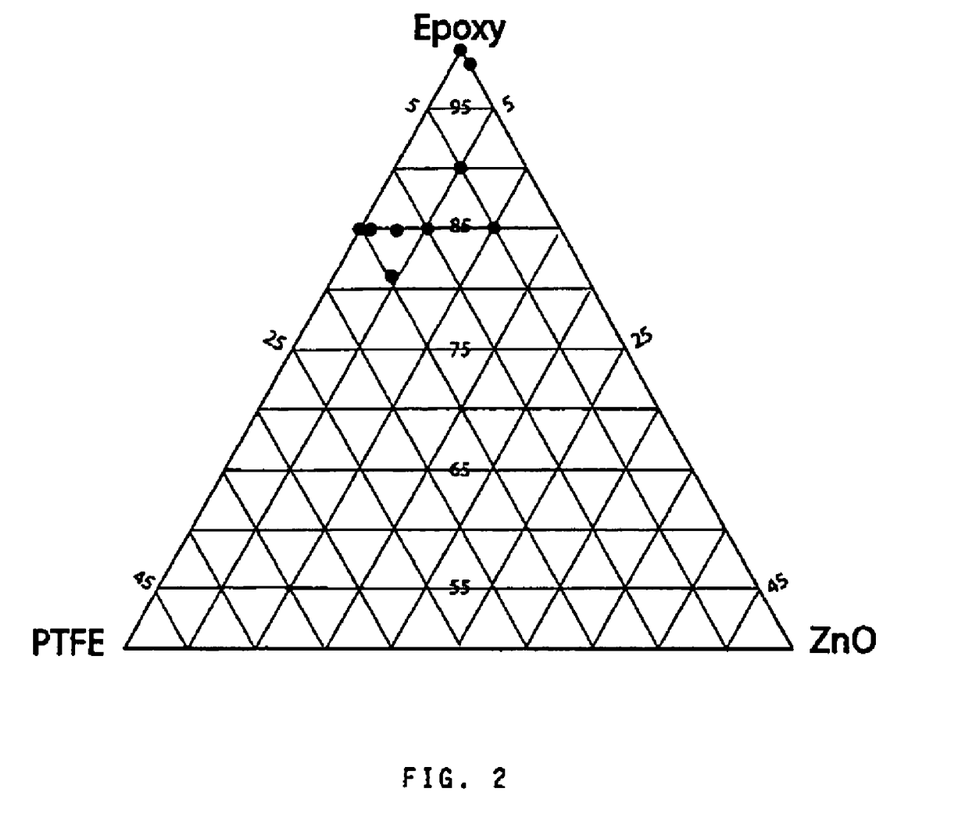
FIG. 2 is a ternary diagram with the matrix epoxy material at the pinnacle of the diagram and the filler materials, ZnO and PTFE, at respective bottom corners. The lines on the ternary diagram are line of constant volume percent.
Figure 3A:
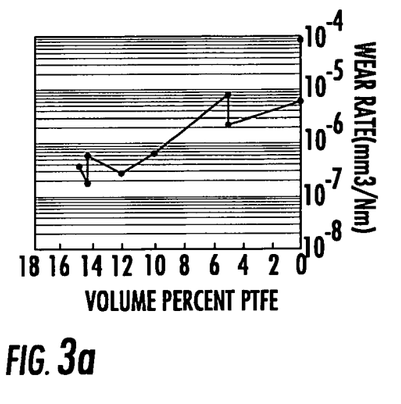
FIGS. 3(a)-(c) provide steady state wear data for epoxy nanocomposites according to the invention as a function of composition. The tests were run on a reciprocating tribometer under a 250N load and a 50.8 mm/s sliding speed.
Figure 3B:
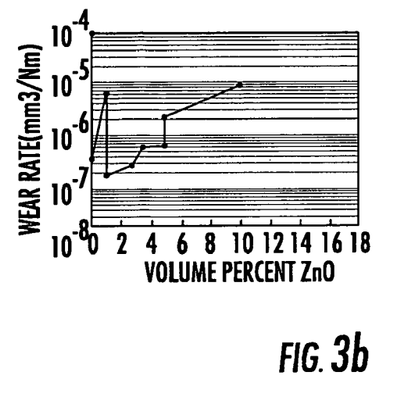
Figure 3C:
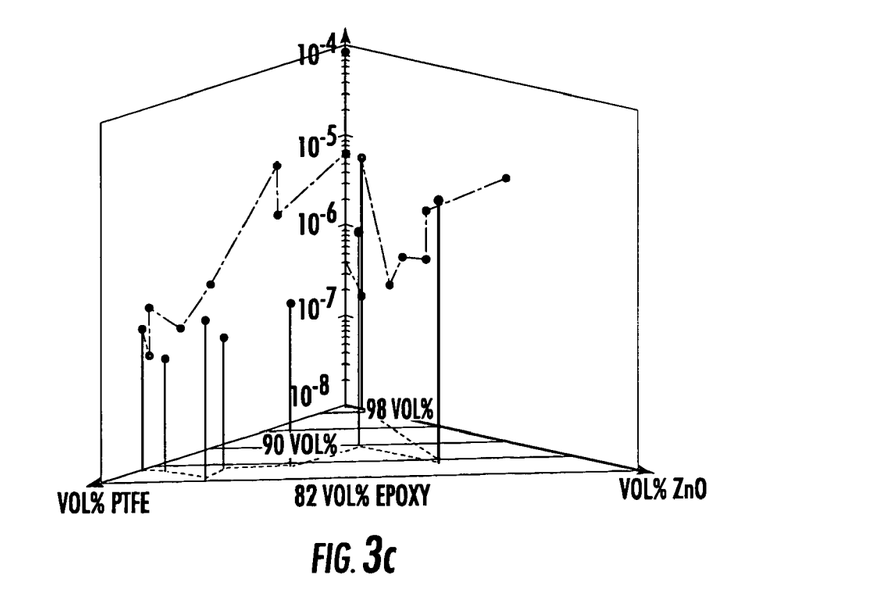
Figure 4A:
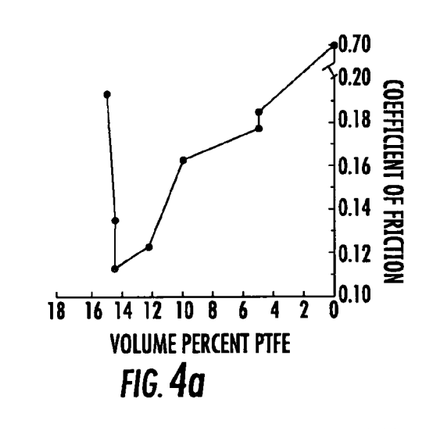
FIGS. 4(a)-(c) provide average steady state friction coefficient data for epoxy nanocomposite according to the invention as a function of composition. As with the data shown in FIGS. 3(a)-(c), the tests were run on a reciprocating tribometer under a 250N load and a 50.8 mm/s sliding speed.
Figure 4B:
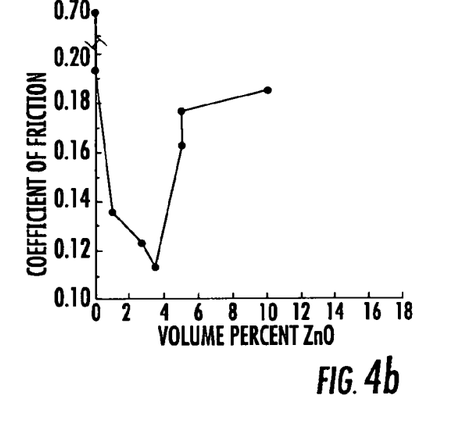
Figure 4C:
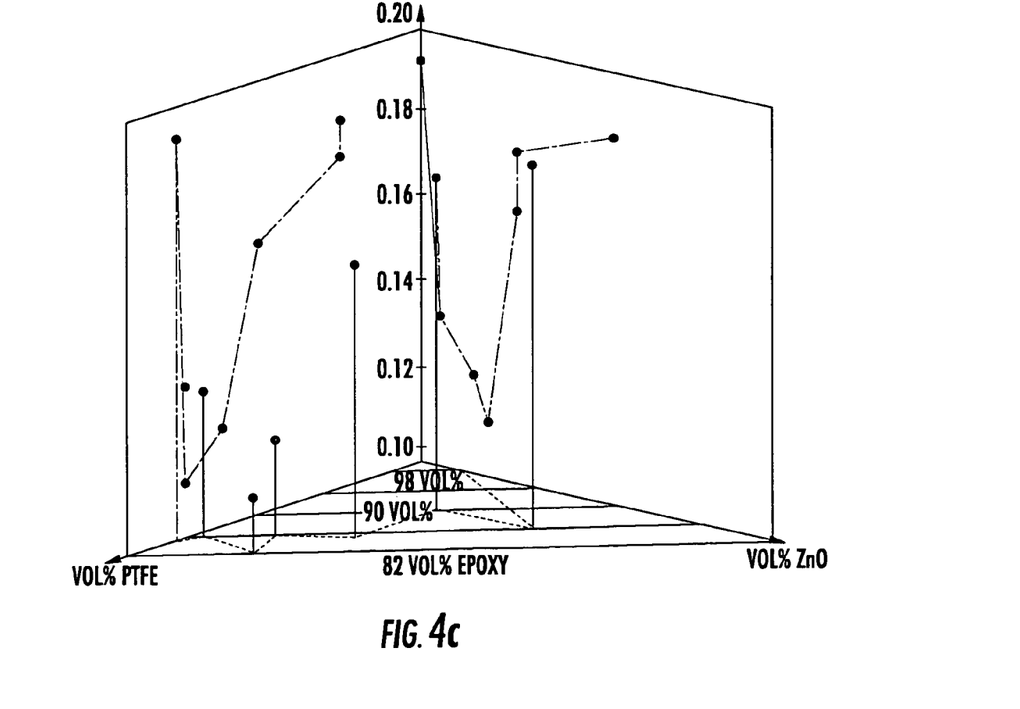

FIG. 2 is a ternary diagram which represents all three components of the exemplary composite material with the epoxy matrix material at the top point and the fillers, zinc oxide and PTFE, on the side points. The lines on the ternary diagram are lines of constant volume percent of each constituent. Samples with less than fifty volume percent epoxy were not tested because it was found that saturation of the epoxy with nanoparticles caused the epoxy not to harden and cure. To find the next optimum sample, a plane was fit to the three initial points based on the wear rates of the samples. Then, the gradient of the plane was used to determine the direction'to the next optimum point at some fixed distance from the center of the three original points. Once the next point is tested, the samples' wear rate along with the lowest two wear rates from the previous samples were used to create the plane and find the next point. This process was then repeated until the desired wear rate was obtained.

Tribology experiments were run on a linear reciprocating pin-on-disk tribometer, which tests the friction coefficient and the wear of the samples. The tribometer used an uncertainty analysis of the friction coefficient and wear rate are discussed in detail in papers by Schmitz et al [Schmitz, T., et al., The difficulty of measuring low friction: Uncertainty analysis for friction coefficient measurements. JOURNAL OF TRIBOLOGY-TRANSACTIONS OF THE ASME, 2005. 127(3): p. 673-678], and Schmitz et al [Schmitz, T., et al., Wear-rate uncertainty analysis. JOURNAL OF TRIBOLOGY-TRANSACTIONS OF THE ASME, 2004. 126(4): p. 802-808]. The counterfaces were lapped 35 plates of AISI 304 stainless steel as described in a paper by Burris and Sawyer [Burris, D. and W. Sawyer, Tribological sensitivity of PTFE/alumina nanocomposites to a range of traditional surface finishes; TRIBOLOGY TRANSACTIONS, 2005. 48(2): p. 147-153]. The samples were ¼ in×¼ in×½ in size with a normal force of 250 N (6.3 MPa). The reciprocating length was 25.4 mm and the average sliding speed was 50.8 mm/s. The samples were run up to 450,000 cycles or 22.9 km.

Samples and counterfaces were cleaned with methanol prior to running the experiments. Due to environmental uptake of the epoxy matrix, a gravimetric method could not be utilized to determine mass loss for samples that were very wear resistant. To determine wear for these samples the reciprocating tribometer was equipped with a Linear Variable Displacement Transducer (LVDT) that measures the change in height of the sample during the test. This change in height was then multiplied by the cross-sectional area of the sample to obtain a wear volume, and consequently a wear rate.

As noted above, epoxy is not inherently lubricious. Epoxy has a room temperature coefficient of friction of $\mu$=0.704. PTFE lowered the coefficient of friction of the composition. With 14.5 volume percent of nanoscale PTFE the friction coefficient was as low as $\mu$=0.113 at steady state. FIGS. 3(a)-(c) and FIGS. 4(a)-(c) show data from the samples studied and the corresponding wear rates and friction coefficient versus the volume percent of each filler (PTFE and ZnO) and the total filler volume percent, respectively.

The sample tested having the lowest wear rate, k=1.79× $10^{-7}$ mm$^3$/Nm, comprised 1 volume percent ZnO and 14.5 volume percent PTFE. The sample with the lowest friction coefficient, $\mu$=0.113, contained 3.5 volume percent zinc oxide and 14.5 volume percent PTFE. Table 1 shown below has the average steady state values for wear rate and friction coefficient for the samples studied.

The trend for wear rate initially pointed to composite having no zinc oxide filler and 15 volume percent of PTFE. However, after testing a composite with no zinc oxide and 15 volume percent PTFE it was demonstrated that the addition of small amounts of zinc oxide nanoparticles provided the lowest wear rate and friction coefficient. The wear rate and friction coefficient of the sample without zinc oxide and 15 volume percent PTFE was k=3.70×$10^{-7}$ mm$^3$/Nm and $\mu$=0.193, respectively.

TABLE 1

| volume concentration | | | | |
| --- | --- | --- | --- | --- |
| Epoxy | ZnO | PTFE | k × $10^{-6}$ (mm$^3$/Nm) | cof |
| 85 | 5 | 10 | 0.658 | 0.163 |
| 85 | 10 | 5 | 8.130 | 0.185 |
| 90 | 5 | 5 | 2.290 | 0.177 |
| 85 | 2.75 | 12.25 | 0.281 | 0.123 |

TABLE 1-continued

| volume concentration | | | | |
| --- | --- | --- | --- | --- |
| Epoxy | ZnO | PTFE | k × $10^{-6}$ (mm$^3$/Nm) | cof |
| 82 | 3.5 | 14.5 | 0.607 | 0.113 |
| 84.5 | 1 | 14.5 | 0.179 | 0.135 |
| 85 | 0 | 15 | 0.370 | 0.193 |
| 100 | 0 | 0 | 83.500 | 0.704 |
| 99 | 1 | 0 | 6.100 | 0.273 |

Figure 5:
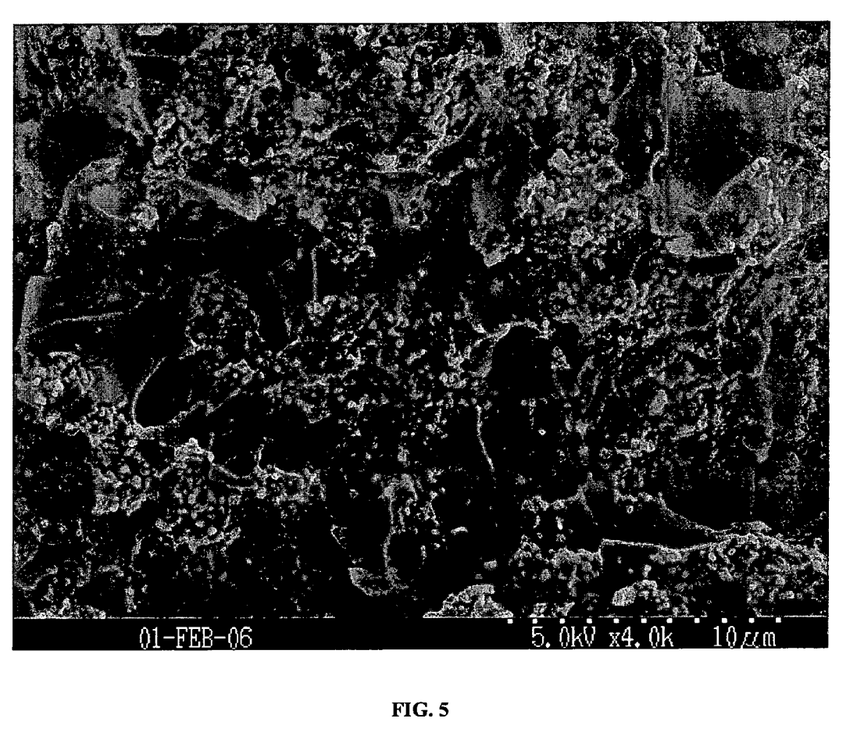
FIG. 5 is a scanned SEM showing a substantially uniform distribution of the nano-PTFE and nano-zinc oxide particles in the epoxy for a 14.5 vol % PTFE/1 vol % $ZnO_2$/84.5 vol % epoxy composite.

FIG. 5 is a scanned SEM showing a substantially uniform distribution of the nano-PTFE and nano-zinc oxide particles in the epoxy for the 14.5 vol % PTFE/1 vol % ZnO$_2$/84.5 vol % epoxy composite. This composite corresponds to the 6th sample in Table 1 above. As noted above, the 14.5 vol % PTFE/1 vol % ZnO$_2$/84.5 vol % epoxy composite sample was found to provide the best wear performance of composites according to the invention listed in the Table above.

The experiments described above demonstrate that wear resistance of synthetic resin based nanocomposites according to the invention is unexpectedly significantly increased with the addition of small volume percents of hard nanoparticles (zinc oxide nanoparticles) and transfer film forming particles (nanoparticles of PTFE). The friction coefficient was found to decrease with the addition of zinc oxide nanoparticles and was further decreased with the addition of PTFE nanoparticles.

Figure 6:
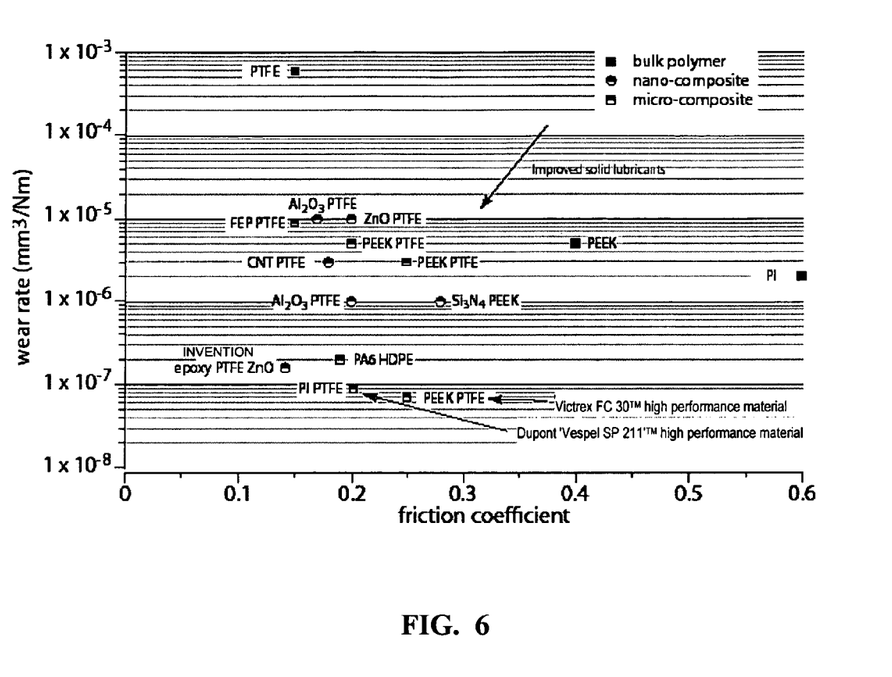
FIG. 6 shows comparative data showing wear rate and friction coefficient data for an inventive composite identified as the "Invention" as compared to several disclosed composites, as well as several bulk polymers. Wear rates and friction coefficients provided by composites according to the invention are comparable to or better than the current commercial state of the art materials as shown in this Figure.

FIG. 6 shows comparative data showing wear rate and friction coefficient data for an inventive composite epoxy matrix with 1 vol. % ZnO and 14.5 vol. % PTFE identified as "epoxy PTFE ZnO", as compared to several disclosed nanocomposites and microcomposites, as well as several bulk polymers. Dupont "Vespel SP 211™" is a PTFE filled polyimide, while Victrex FC 30™ is a PTFE filled PEEK. The invention is seen to provide an excellent combination of friction coefficient and wear rate performance. Wear rates and friction coefficients are comparable to or better than the current commercial state of the art composites as shown in this FIG.

A comparative example was prepared from micron-scale PTFE particles mixed with epoxy, which is believed to be representative of a commercially available alternative to the inventive material described herein. The wear rate of the commercially available material based on testing performed was found to be significantly higher than the inventive material as described below.

The particles used in the fabrication of the commercially available alternative were DuPont PTFE 7C™. The estimated average diameter of the PTFE particles of 20 μm. The epoxy resin was a two-phase SC-15™ epoxy resin system, supplied by Applied Poleramic Inc. (API). The SC-15 resin has a relatively low viscosity (590 cP) at room temperature. A 10% by volume PTFE/epoxy composite was formed.

The fabricating procedure for casting the commercially available alternative composite samples comprised:
1. The DuPont PTFE 7C™ particles were added to the epoxy resin and manually stirred for 10 min.
2. The epoxy/particle solution was then mixed in a Hauschild mixer 3000 rpm for 3 minutes.
3. The hardener (resin:hardener=10:2.64 wt %) was then added into the resin/particle mixture and manually stirred for 5 min.
4. Next, the mixture was cast in a mold and cured in an oven at 60 C for 2 h Composite samples obtained were run on a linear reciprocating tribometer. The samples were 6.35 mm×6.35 mm×12.7 mm in size and a normal force of 250 N (6.3 MPa) was applied. The reciprocating length was 25.4 mm and the average sliding speed was 50.8 mm/s. The samples were run up to 300,000 cycles depending on the wear resistance of the composite. The Wear Rate (k) obtained was $49*10^{-6}$ mm$^3$/N*m while the Friction Coefficient ($\mu$) obtained was 0.29. By comparison to data provided in Table 1 above it can be seen that both the measured wear rate and friction coefficient of the 20 urn PTFE (DuPont 7C™) were very high compared to the inventive material. Specifically, most composites according to the invention provided a wear rate (k) of $<1*10^{-6}$ mm$^3$/N*m and a friction coefficient ($\mu$) of <0.2 (See Table 1).

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A wear resistant lubricious composite, comprising:
   80-99 volume % of a continuous phase synthetic resin binder or, if the continuous phase synthetic resin binder is epoxy resin, 60-85 vol-% of a synthetic resin binder;
   1-18 volume % of a plurality of transfer film forming particles
   wherein said transfer film forming particles comprise nanoparticles selected from the group consisting of PTFE nanoparticles, WS$_2$ nanoparticles, MoS$_2$ nanoparticles, BN nanoparticles, and FEP nanoparticles, and
   0.5-10 volume % of a plurality of hard nanoparticles selected from the group consisting of metal oxide, metal carbide and metal nitride nanoparticles,
   wherein said transfer film forming particles and said hard nanoparticles are distributed in said continuous phase synthetic resin binder.

2. The composition of claim 1, wherein said nanoparticles are PTFE nanoparticles.

3. The composition of claim 1, wherein said nanoparticles are FEP nanoparticles.

4. The composite of claim 1, wherein said synthetic resin is an epoxy resin, and said hard nanoparticles comprise zinc oxide nanoparticles.

5. The composite of claim 4, wherein said transfer film forming particles comprise PTFE and said composite comprises between 60 and 85 volume % epoxy resin, 12 to 17 vol. % PTFE and 0.8 to 5 volume % zinc oxide nanoparticles.

6. The composition of claim 1, wherein a wear rate of said composite is $<1 \times 10^{-6}$ mm$^3$/Nm and a friction coefficient of said composite is <0.2.

7. The composition of claim 1, further comprising a base metal article, wherein said composition is disposed on said base metal article.

8. A method of forming wear resistant lubricious composite articles, comprising the steps of:
   providing a liquid phase synthetic resin precursor;
   adding a plurality of transfer film forming particles and a plurality of hard nanoparticles selected from the group consisting of metal oxide, metal carbide and metal nitride nanoparticles to said resin precursor to form a mixture;
   adding a hardener to said mixture, and
   curing said mixture.

9. The method of claim 8, further comprising the step of dispersing said transfer film forming particles and said plurality of hard nanoparticles after said adding step.

10. The method of claim 9, further comprising the step of applying said mixture to a surface to be coated before said adding hardener step.

11. The method of claim 10, wherein said surface to be coated comprises a metal or a metal alloy.

12. The method of claim 8, wherein said transfer film forming particles comprise PTFE.

13. The method of claim 12, wherein said PTFE particles comprise PTFE nanoparticles.

14. The composite of claim 8, wherein said synthetic resin is an epoxy resin, and said hard nanoparticles comprise zinc oxide nanoparticles.

15. The method of claim 14, wherein said composite comprises between 60 and 85 volume % epoxy resin, 12 to 17 vol. % PTFE nanoparticles and 0.8 to 5 volume % zinc oxide nanoparticles.

16. The method of claim 8, wherein a wear rate of said composite is $<1 \times 10^{-6}$ mm$^3$/Nm and a friction coefficient of said composite is <0.2.

* * * * *